(12) United States Patent
Jang

(10) Patent No.: US 7,924,055 B2
(45) Date of Patent: Apr. 12, 2011

(54) DATA TRANSMITTING SYSTEM

(75) Inventor: Dae Joong Jang, Gyeonggi-do (KR)

(73) Assignee: Dongbu Hitek Co., Ltd., Seoul (KR)

( * ) Notice: Subject to any disclaimer, the term of this patent is extended or adjusted under 35 U.S.C. 154(b) by 0 days.

(21) Appl. No.: 12/616,631

(22) Filed: Nov. 11, 2009

(65) Prior Publication Data

US 2010/0124298 A1      May 20, 2010

(30) Foreign Application Priority Data

Nov. 14, 2008   (KR) .................. 10-2008-0113547

(51) Int. Cl.
*H03K 19/0175* (2006.01)
*H03K 19/094* (2006.01)

(52) U.S. Cl. ............................................. 326/82; 326/86

(58) Field of Classification Search .................... 326/26, 326/27, 82, 83, 86, 90; 327/108; 375/296
See application file for complete search history.

(56) References Cited

U.S. PATENT DOCUMENTS

| | | | |
|---|---|---|---|
| 6,556,060 B1 * | 4/2003 | Dillon et al. | 327/210 |
| 6,825,696 B2 * | 11/2004 | Jaussi et al. | 327/55 |

* cited by examiner

*Primary Examiner* — Daniel D Chang
(74) *Attorney, Agent, or Firm* — Saliwanchik, Lloyd & Eisenschenk

(57) ABSTRACT

A data transmitting system is provided that includes a transmitter that suppresses coupling noise by being operated using a differential voltage driving scheme at the time of transmitting data and being operated using a common voltage driving scheme by equalizing potential of a pair of transmission lines during a transition interval; and a receiver that is connected to the transmitter through the pair of transmission lines and recovers the data by sensing the voltage difference in signals of the pair of transmission lines.

9 Claims, 2 Drawing Sheets ated Nov. 14, 2008, which is hereby incorporated by reference in its entirety.

DATA TRANSMITTING SYSTEM

CROSS-REFERENCE TO RELATED APPLICATION

This application claims the benefit under 35 U.S.C. §119 of Korean Patent Application No. 10-2008-0113547, filed Nov. 14, 2008, which is hereby incorporated by reference in its entirety.

BACKGROUND

Two schemes have typically been used when transmitting data through a transmission line that connects between two or more semiconductor chips.

The first scheme converts and transmits data signals into a difference in a current intensity that is output to the transmission line.

The second scheme converts data into a voltage difference at a transmitting side, carries the voltage difference on the transmission line, detects the voltage difference at a receiving side, and recovers the data.

The above-mentioned voltage driving scheme may be classified into a single voltage driving scheme that assigns one transmission line for each data according to the number of lines receiving one bit data and provides the data as the magnitude of the voltage value, and a differential voltage driving scheme that assigns two transmission lines for each data and provides the data as the dominance of the voltage value of transmission lines.

The differential voltage driving scheme remarkably reduces the distortion due to noise of the transmission signals as compared to the single voltage driving scheme, but has problems in that an interference phenomenon occurs between the transmission lines and that the parasitic capacitor component in the transmission lines is increased.

In particular, an output end of the transmission side is provided with a metal oxide semiconductor (MOS) switch in order to level-down logic signals to small signals and provides the logic signals as high or low. However, the MOS switch tends to have large parasitic capacitance, resulting in the parasitic capacitor component in the transmission lines.

Therefore, the input logic signals induce a coupling noise in the output small signals to cause the distortion of the output signal. Thereby, the trigger time of the output signal is long and the degradation of transmission speed occurs. In addition, the coupling noise voltages are induced differently to the differential voltage terminal, such that the common mode voltage fluctuates.

BRIEF SUMMARY

An embodiment of the present invention provides a data transmitting system that reduces signal coupling noise due to parasitic capacitance in a MOS switch of a transmitter. Embodiments can shorten a transition time of a signal and match noise voltage induced to a differential terminal, making it possible to inhibit fluctuation of the common mode voltage.

The data transmitting system according to an embodiment includes a transmitter that suppresses the coupling noise by being operated according to a differential voltage driving scheme at the time of transmitting data and being operated according to a common voltage driving scheme by equalizing the potential of a pair of transmission lines during a transition interval; and a receiver that is connected to the transmitter through the pair of transmission lines and recovers the data by sensing the voltage difference in signals of the pair of transmission lines.

DETAILED DESCRIPTION

A data transmitting system according to an embodiment will be described in detail with reference to the accompanying drawings.

Hereinafter, the detailed description of a related known functions or configurations that may unnecessarily obscure the subject matter of the present invention in describing the present invention will be omitted. Therefore, only the core components, which are directly related with the technical idea of the present invention, will be described.

Figure 1:
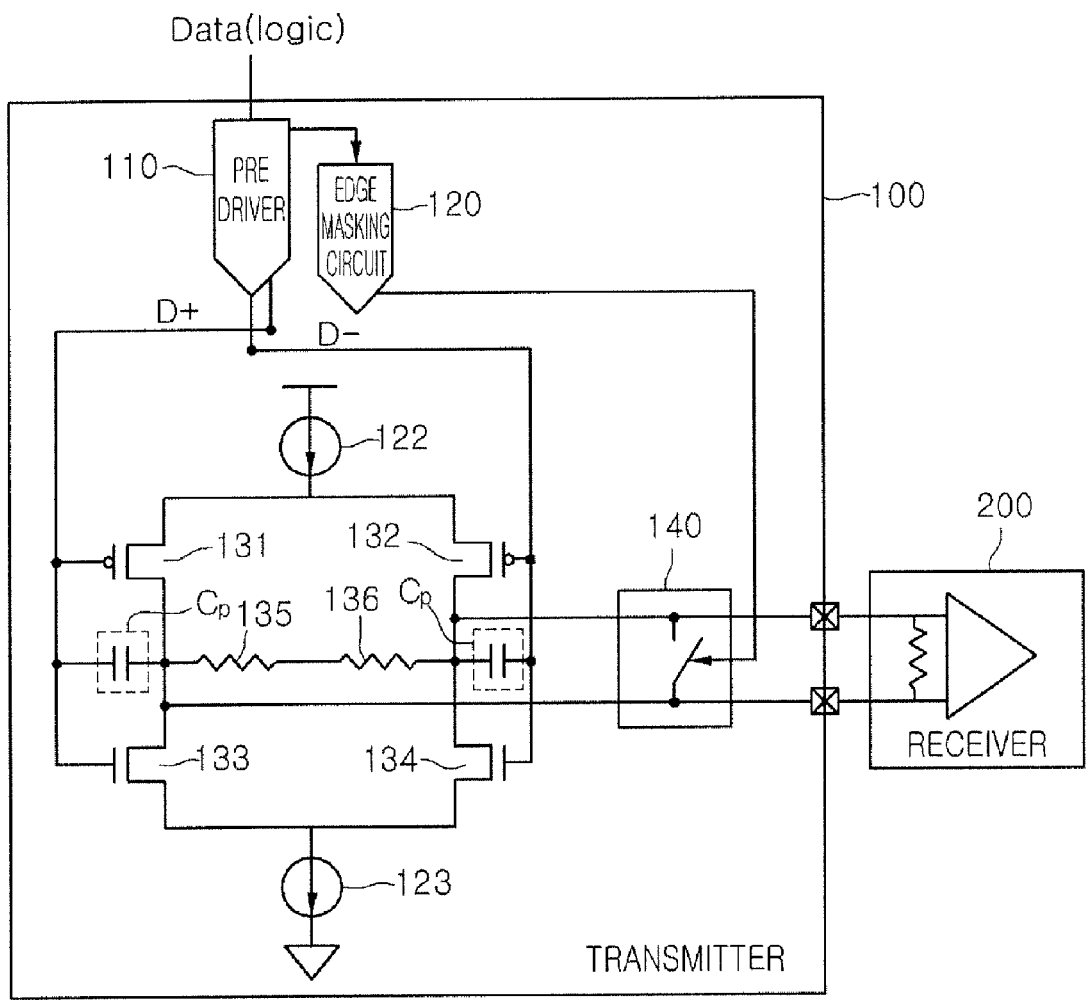
FIG. 1 is a block diagram including schematic components of a data transmitting system according to an embodiment.
Figure 2:
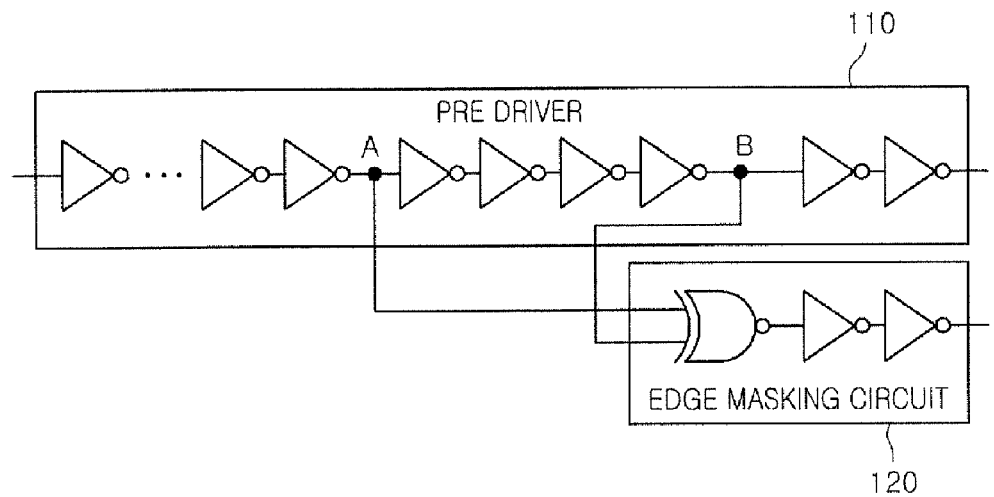
FIG. 2 is a block diagram including schematic components of a pre-driver and an edge masking circuit in a data transmitting system according to an embodiment.

FIG. 1 is a block diagram of a data transmitting system according to an embodiment. FIG. 2 is a block diagram providing a more detailed view of a pre-driver 110 and an edge masking circuit 120 of a transmitter 100 in accordance with an embodiment of a data transmitting system.

Figure 3:
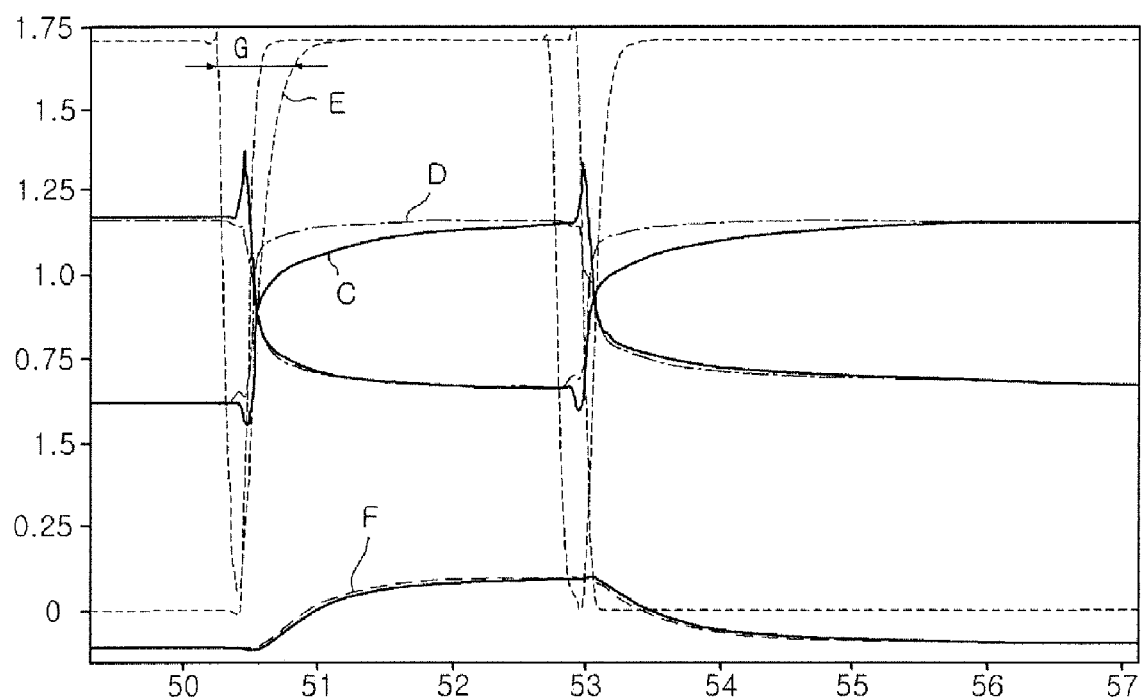
FIG. 3 is a timing diagram graphically showing a signal form processed in the data transmitting system according to the embodiment.

In addition, FIG. 3 is a timing diagram graphically showing a signal form processed in the data transmitting system according to an embodiment.

Referring to FIG. 1, the data transmitting system according to an embodiment includes a transmitter 100 and a receiver 200.

The transmitter 100 is a component that performs a function of an output buffer. The transmitter 100 is configured to include a pre-driver 110, an edge masking circuit 120, a first current source 122, a second current source 123, a first transistor 131, a second transistor 132, a third transistor 133, a fourth transistor 134, a first resistor 135, a second resistor 136, and a switch circuit 140.

The data transmitting system in accordance with an embodiment is operated according to a differential voltage driving scheme. Therefore, a signal output through one terminal of the transmitter 100 is returned to the transmitter 100 through a second terminal of the transmitter 100 via the receiver 200 and flows to a ground end side of the transmitter 100.

For reference, in the case of the differential current driving scheme, the signal transmitted from the transmitter flows to the ground end side of the receiver and the receiver includes a circuit such as a mirror circuit to convert the current at that time into voltage and recognize the data by the voltage difference.

The receiver 200 in accordance with an embodiment includes a receiving converter that generates the voltage of the input signal, a transmitting converter that generates the voltage of the signal to be output back to the transmitter 100, and a differential amplifier that operates and amplifies a level difference between the two generated voltages to sense the voltage difference between the two signal lines.

A focus of the technical idea of the data transmitting system in accordance with an embodiment is to improve the configuration and operation of the transmitter and therefore, the detailed description of the receiver 200 will be omitted.

Referring to FIG. 1, the pre-driver 110 functions so that the logic circuit can fully swing a data logic signal. The pre-driver 110 accomplishes this function by performing a buffer function when logic data (hereinafter, referred to as "logic signal") is transmitted from, for example, a processor.

In addition, the pre-driver 110 maintains or improves a vertical state for a transition from one state to another state (see e.g., transition states in the plot in FIG. 3) so that the signal is not sloped during a transition interval, making it possible to increase a valid processing time of the data and shorten the data transmission speed.

In one embodiment, the first transistor 131 and the second transistor 132 are provided as P-channel Metal-Oxide-Semiconductor Field-Effect Transistors (PMOS) to form a first coupling circuit, and a third transistor 133 and a fourth transistor 134 are provided as an N-channel Metal-Oxide-Semiconductor Field-Effect Transistors (NMOS) to form a second coupling circuit.

When the logic signals are transmitted from the pre-driver 110, the first to fourth transistors 131, 132, 133 and 134 level-down the logic signals to small signals and are operated as MOS transistors (switches) to provide the leveled-down small signals as high or low.

The connection configuration of the first, second, third and fourth transistors 131-134 will be described below.

A source of the first transistor 131 and a source of the second transistor 132 are connected to a first current source 122.

Further, a gate of the first transistor 131 is connected to the pre-driver 110 to receive a first phase signal (D+) among the logic signals. The gate of the first transistor 131 is also connected to the drain of the first transistor 131 and the gate and the drain of the third transistor 133 such that the first phase signal (D+) is also provided to the drain of the first transistor 131 and the gate and drain of the third transistor 133.

A gate of the second transistor 132 is connected to the pre-driver 110 to receive a second phase signal (D−) among the logic signals. The gate of the second transistor 132 is also connected to the drain of the second transistor 132 and gate and drain of the fourth transistor 134 such that the second phase signal (D−) is also provided to the drain of the second transistor 132 and the gate and drain of the fourth transistor 134.

A source of the third transistor 133 and a source of the fourth transistor 134 are connected to the second current source 123.

A series connection of a first resistor 135 and a second resistor 136 is connected in parallel between the coupling circuit of the first transistor 131 and the second transistor 132 and the coupling circuit of the third transistor 133 and the fourth transistor 134, thereby providing a potential difference having a predetermined value between the coupling circuits.

The first current source 122 is connected to a power supply, and a base current, which provides a base logic state, is supplied to the transmission line connected at the drain of the second transistor 132 of the first coupling circuit among the pair of the transmission lines connected to the receiver 200.

The second current source 123 is connected to a ground end, and a base current, which provides a base logic state, is supplied to the transmission line connected at the drain of the third transistor 133 of the second coupling circuit among the pair of the transmission lines connected to the receiver 200.

In an embodiment, the first current source 122 and the second current source 123 can be implemented as a current mirror circuit using a semiconductor device.

Meanwhile, referring to FIG. 1, a parasitic component (Cp) exists between the drains and gates of the first and third transistors 131 and 133 and the drains and gates of the second and fourth transistors 132 and 134.

For reference, the capacitor (Cp) shown in FIG. 1 does not mean an actual device (i.e. a physical capacitor), but indicates the parasitic capacitance component.

The above-mentioned parasitic capacitance induces the logic signals input to each transistor 131 to 134 to an output node, causing the transition (or trigger) of the signals to become long.

In order to address problems caused by the above-mentioned parasitic capacitance, embodiments of the present invention include an edge masking circuit 120 and a switch circuit 140.

Referring to FIG. 3, a measuring line (dark line "C") indicates the signals of the transmitter 100 without the inclusion of the edge masking circuit 120 and the switch circuit 140, showing the instant and sudden signal bounding ("referred to as "peak noise" or "coupling noise due to the parasitic capacitance") during the transition interval due to the influence of the parasitic capacitance.

Moreover, the time required for the swing of the signal to smoothly occur is based on the generation of the coupling noise, and the settling time required to accurately provide the data becomes long. Thus, the data transmission time becomes long.

According to an embodiment, the transmitter 100 is operated according to a common mode voltage scheme during the transition interval of the logic signals through using the switching circuit 140 and the edge masking circuit 120, making it possible to minimize the influence of the parasitic capacitance.

Referring to FIG. 2, the pre-driver 110 according to one embodiment includes a plurality of inverters connected in series, and the edge masking circuit 120 includes an exclusive OR (EX-OR or XOR) gate and a plurality of inverters connected in series.

In addition, one input end of the EX-OR gate of the edge masking circuit 120 is connected to an input end of one inverter among the inverters of the pre-driver 110 to form a first node (A) and the other input end of the EX-OR gate is connected to an output end of an inverter of the series-connected plurality of inverters after an even number of inverters from the first node (A) among the inverters of the pre-driver 110 to form a second node (B). That is, an even number of inverters are disposed between node (A) and node (B).

In a specific embodiment, the number of inverters of the pre-driver 110 between the first node (A) and the second node (B) is four.

The inverter of the pre-driver 110 immediately after the first node (A) is an inverter that processes the logic signals when the transition interval starts, and the inverter of the pre-driver 110 immediately before the second node (B) is an inverter that processes the logic signals when the transition interval ends.

Therefore, the EX-OR gate of the edge masking circuit 120 receives the signal of the first node (A) and the signal of the second node (B) to output a high signal ("1"). At this time, as shown in FIG. 3, an output signal (E) is maintained by an amount of time that the logic signals are consumed to pass through the four inverters between the first node (A) and the second node (B) of the pre-driver 110.

In other words, the output signal (E) of the EX-OR gate may be delayed until the signal of the second node (B) is input (during the transition interval of the logic signal) to the EX-OR gate after the signal of the first node (A) is input.

In other words, the edge masking circuit 120 generates a control signal (E) of the switch circuit 140 while the buffering of the transition time of the logic signals is performed through the inverter of the pre-driver 110.

This will be described below with reference to FIG. 3.

In FIG. 3, a measuring line "E" shows the output signal (E) of the edge masking circuit 120. The output signal (E) is the control signal of the switch circuit 140 and operates the switch circuit 140 during a time (G) including the transitions interval of the logic signals.

At this time, as shown in the measuring line "C", the coupling noise occurs due to the parasitic capacitance during the transition interval. Therefore the edge masking circuit 120 transmits the output signal (E) to the switch circuit 140 during the interval (G) including the transition interval.

The switch circuit 140 receives the output signal (control signal) (E) from the edge masking circuit 120 and shorts the pair of the transmission lines connected to the receiver 200 during the interval where the first phase signal (D+) and the second phase signal (D−) are transited (this interval is included in the G interval and generates the coupling noise).

This means that the switch circuit 140 equalizes the potential of the pair of the transmission lines before the logic signals are transmitted.

In other words, the switch circuit 140 shorts the differential signal in the common mode state by the differential current driving scheme according to the control signal (E) of the edge masking circuit 120, making it possible to suppress the phenomenon that the coupling noise occurs in the transition (trigger) interval.

Referring to the graph of FIG. 3, a measuring line "D" measures the output signal of the transmitter 100 when the switch circuit 140 and the edge masking circuit 120 are provided. It can be confirmed at the measuring line "D" that the coupling noise is removed in the transition interval.

Thereafter, when the "G" interval of the control signal elapses, the switch circuit 140 is switched into an opened state and the first phase signal (D+) and the second phase signal (D−) enter the differential mode such that the phases thereof are shifted.

Therefore, the edge masking circuit 120 should transmit the control signal so that the switch circuit 140 opens a path when the trigger of the signal ends in the pre-driver 110. As such, in order to synchronize the control signal interval with the trigger interval, the number of inverters at the rear end of the second node (B) of the pre-driver 110 and the number of inverters at the rear end of the EX-OR gate in the edge masking circuit 120 can be controlled.

With the embodiment, the influence of the coupling noise is excluded, such that the trigger operation of the logic signals (first phase signal and second phase signal) suddenly occurs as in the measuring line "D", making it possible to shorten the trigger time.

Therefore, the transition time of the output signal (D) can be rapid while inhibiting distortion of the output signal (D) of the transmitter 100 due to the coupling noise, making it possible to increase the valid processing time of the data and shorten the data transmission speed. Moreover, the coupling noise voltage is removed, thereby making it possible to inhibit the phenomenon that the output signals are differently induced to the differential voltage terminal and the common mode voltage is fluctuated.

In addition, the data transmitting system of the differential voltage driving scheme is operated in the common mode voltage scheme in the data transition interval through the edge masking circuit and the switching circuit, making it possible to minimize the influence of the parasitic capacitance.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A data transmitting system comprising:
 a transmitter that suppresses coupling noise, the transmitter configured to operate according to a differential voltage driving scheme during data transmission of logic signals and operate according to a common voltage driving scheme by equalizing the potential of a pair of transmission lines during a transition interval of the logic signals, wherein the transmitter comprises:
  a pre-driver that full-swings logic signals input to the transmitter by performing buffer function;
  a transistor circuit that levels-down the logic signals transmitted from the pre-driver into small signals and is operated as a MOS transistor switch to provide the leveled-down logic signals as high/low;
  a switch circuit for shorting and opening the pair of transmission lines, wherein the pair of transmission lines are connected to the transistor circuit; and
  an edge masking circuit that generates control signals for the switch circuit by using the logic signals processed in the pre-driver, wherein the control signals short the pair of transmission lines during the transition interval of the logic signals; and
 a receiver connected to the transmitter through the pair of transmission lines, wherein the receiver recovers data by sensing a voltage difference in signals from the pair of transmission lines.

2. The data transmitting system according claim 1, wherein the transistor circuit comprises:
 a first current source connected to a power supply end and a second current source connected to a ground end;
 a first transistor having a first source, a first drain, and a first gate, wherein the first source is connected to the first current source, and wherein the first drain and the first gate are connected to the pre-driver to receive a first phase signal;
 a second transistor having a second source, as second drain, and a second gate, wherein the second source is connected to the first current source, and wherein the second drain and the second gate are connected to the pre-driver to receive a second phase signal;
 a third transistor having a third source, a third drain, and a third gate, wherein the third source is connected to the second current source, and wherein the third drain and the third gate are connected to the first drain of the first transistor to receive the first phase signal; and a fourth transistor having a fourth source, a fourth drain, and a fourth gate, wherein the fourth source is connected to the second current source, and wherein the fourth drain and the fourth gate are connected to the second drain of the second transistor to receive the second phase signal.

3. The data transmitting system according to claim 2, wherein the transistor circuit further comprises:

a first resistor connected at a first end to the first drain of the first transistor; and a second resistor connected at a first end to the second drain of the second transistor, wherein a second end of the second resistor is connected to a second end of the first resistor such that the first and second resistors are connected in series.

4. The data transmitting system according to claim 2, wherein the first transistor and the second transistor are PMOS transistors, and the third transistor and the fourth transistor are NMOS transistors.

5. The data transmitting system according to claim 1, wherein the pre-driver comprises a plurality of inverters that are connected in series; and the edge masking circuit comprises an EX-OR gate, wherein one input end of the EX-OR gate is connected to an input end of a first inverter of the plurality of inverters of the pre-driver to form a first node and another input end of the EX-OR gate is connected to an output end of a second inverter of the plurality of inverters of the pre-driver to form a second node, wherein the second inverter is an inverter at a position an even number of inverters from the first node.

6. The data transmitting system according to claim 5, wherein the edge masking circuit further comprises a second plurality of inverters connected to an output end of the EX-OR gate.

7. The data transmitting system according to claim 6, wherein the number of inverters after the second node of the pre-driver and the number of inverters connected to the EX-OR gate of the edge masking circuit are selected to synchronize a control signal interval with the transition interval.

8. The data transmitting system according to claim 5, wherein the number of inverters between the first node and the second node is any one number of 2, 4, 6, 8, 10, 12, 14, 16, 18, and 20.

9. The data transmitting system according to claim 5, wherein the first inverter processes the logic signals when the transition interval of the logic signals starts, and wherein the second inverter processes the logic signals when the transition interval of the logic signals ends.

* * * * *